May 10, 1938.  R. VAN HYNING  2,116,916
METHOD AND APPARATUS FOR REMOVING ARTICLES FROM FORMS
Filed Jan. 18, 1937  4 Sheets-Sheet 4
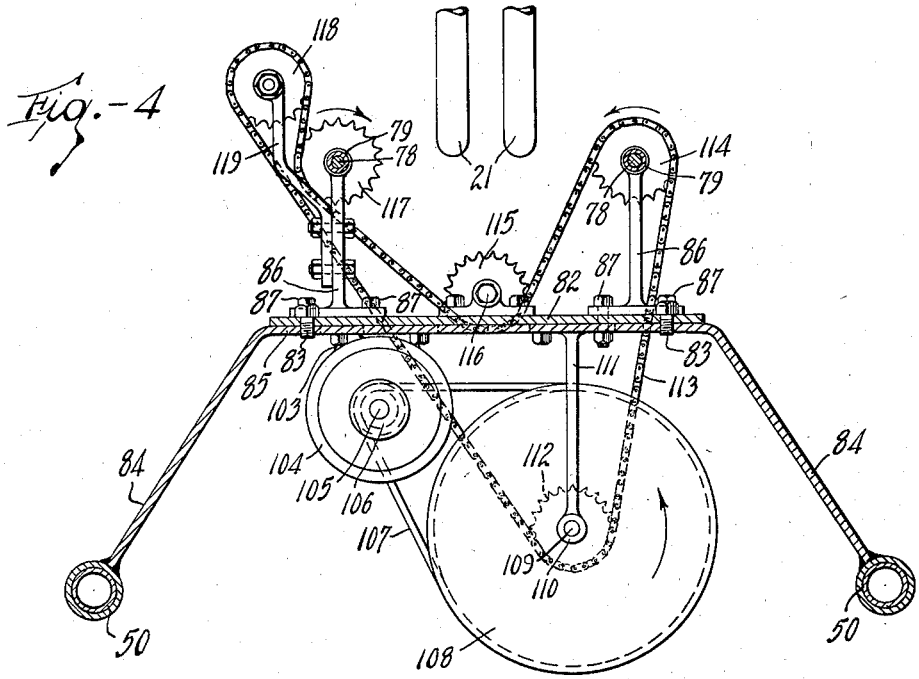
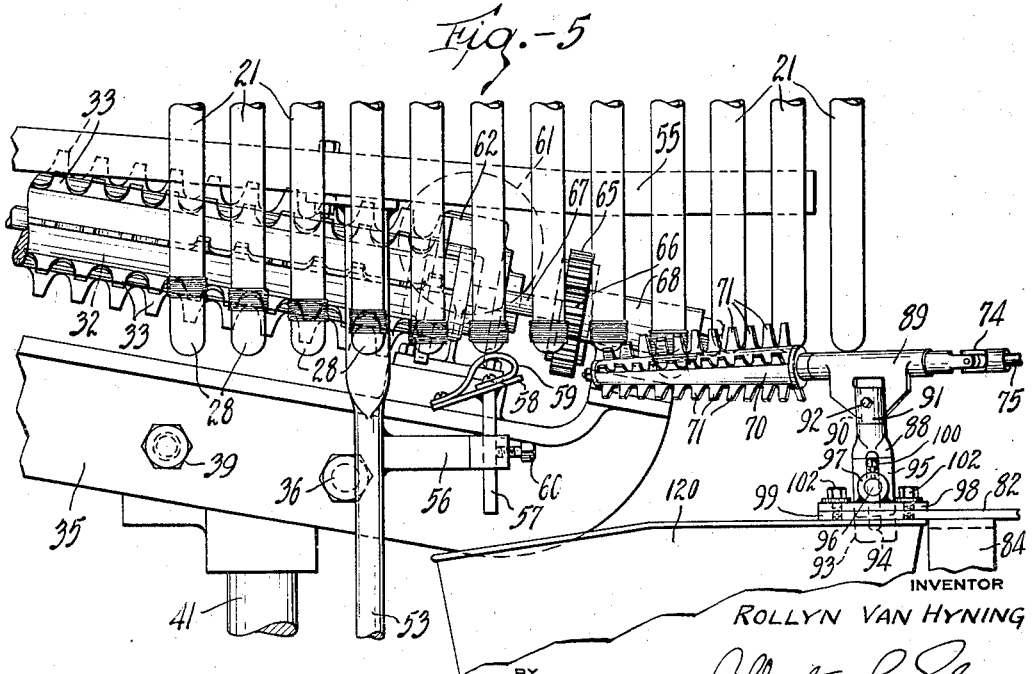
INVENTOR
ROLLYN VAN HYNING
BY Albert L. Ely
ATTORNEY Patented May 10, 1938

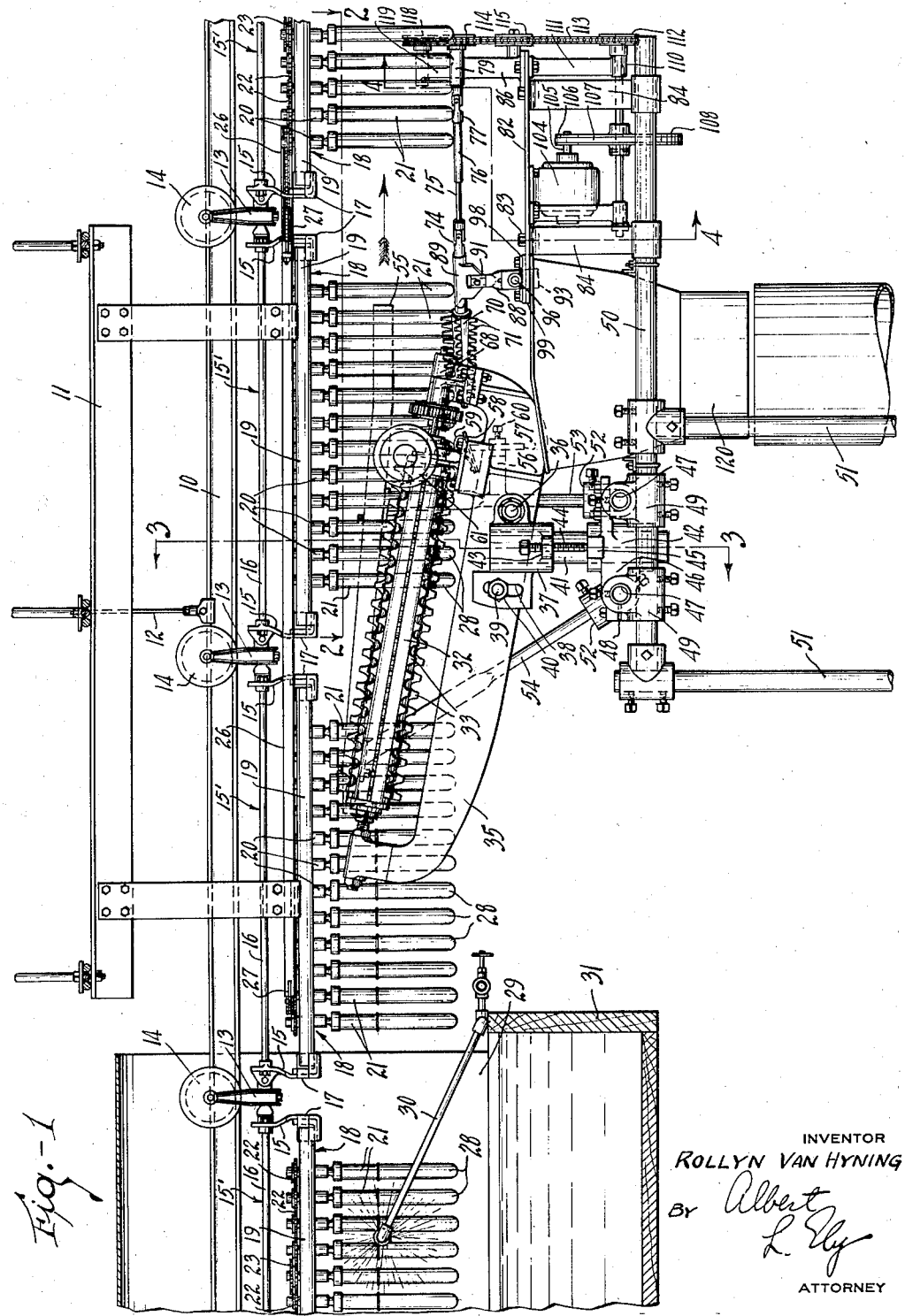

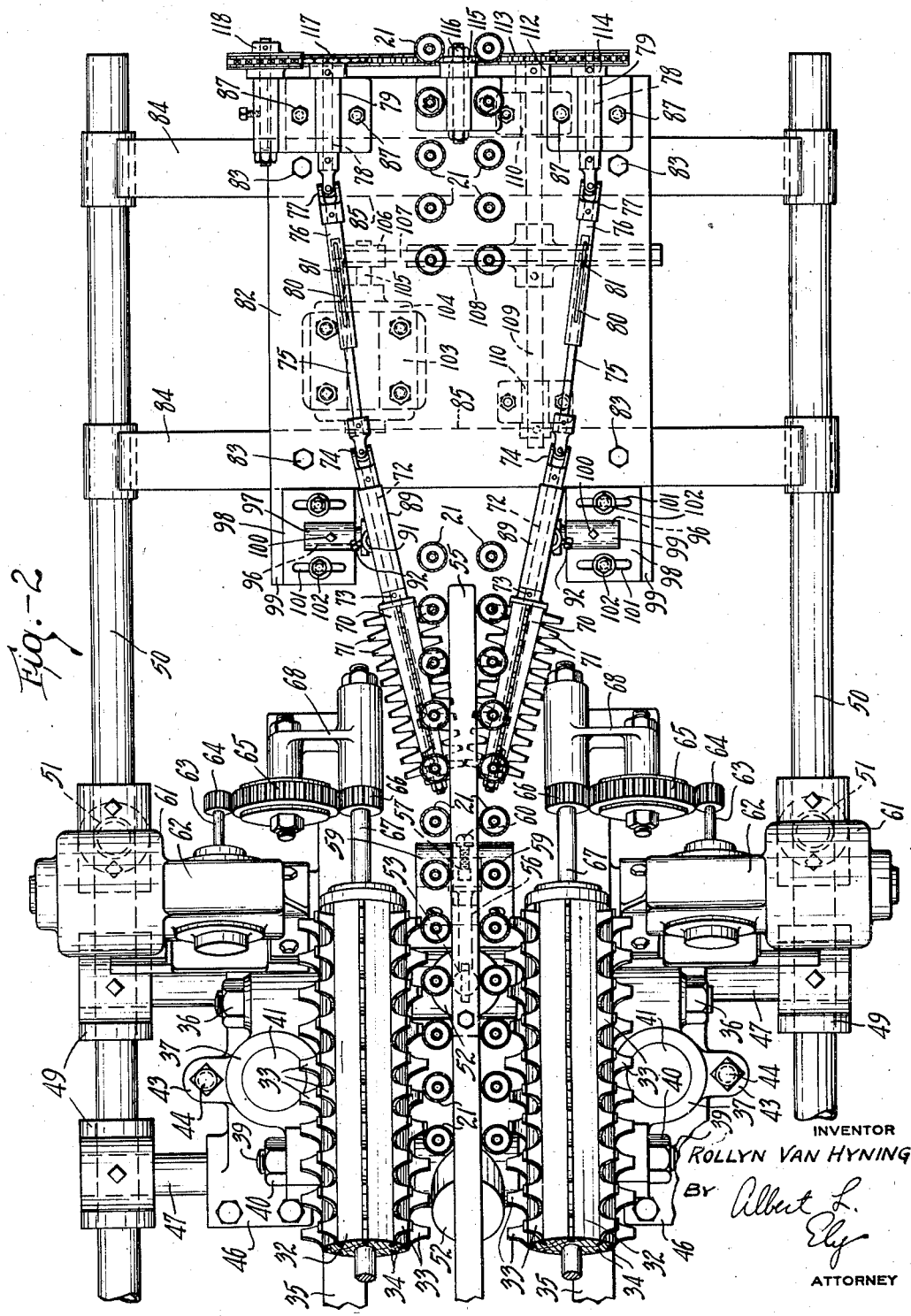

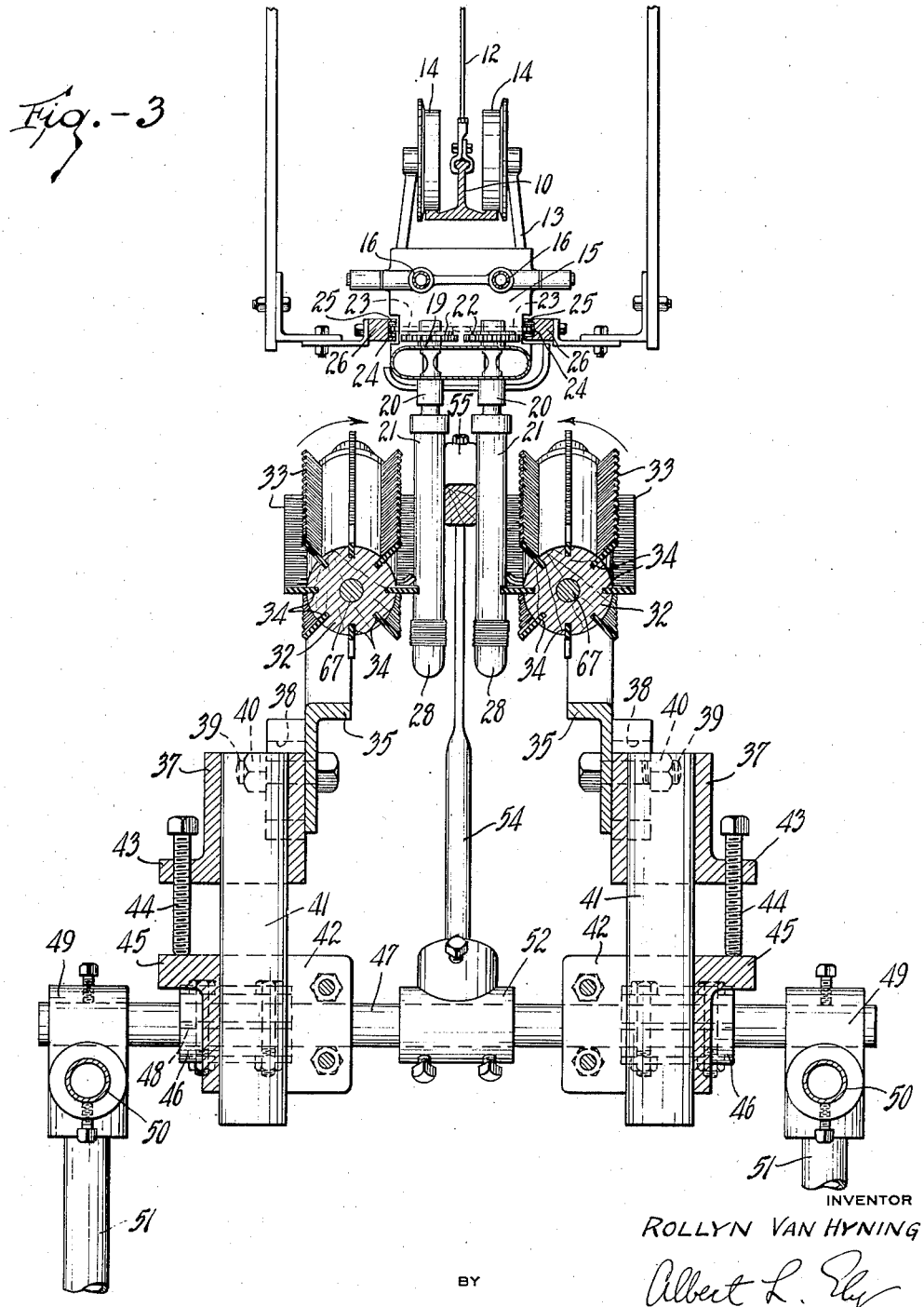

2,116,916

UNITED STATES PATENT OFFICE 2,116,916

METHOD AND APPARATUS FOR REMOVING ARTICLES FROM FORMS

Rollyn Van Hyning, Akron, Ohio, assignor to John R. Gammeter, Akron, Ohio

Application January 18, 1937, Serial No. 121,125

10 Claims. (Cl. 18—2)

This invention relates to a method and apparatus for the removal from forms of dipped rubber articles, such as finger cots, balloons, prophylactics and the like which are made from natural or artificial aqueous dispersions of rubber, for example, rubber latex.

Articles of the character referred to are usually made by dipping forms, which are generally constructed of dense, impervious material such as metal, porcelain or glass, into a rubber dispersion a sufficient number of times to acquire a deposit of the desired thickness thereon. These deposits are then fully or partially cured by passing the forms with the deposits thereon through a vulcanizing medium such as hot water. Subsequently the articles formed by the deposits are removed from the forms and this application is more particularly directed to the removal of these articles from the forms.

The forms used to receive the rubber articles are cylindrical, elongated, tube-like members having a rounded, closed end, and these forms are dipped sufficiently deep in the rubber dispersion whereby a plurality of elongated rubber articles having the contour of the form are produced. One of the problems of this industry is to remove the rubber articles from the forms without permitting them either to roll up or to turn inside out, since considerable manual labor is required to restore rolled-up and inside-out articles to their proper elongated condition for subsequent treatments. One of the objects of this invention is to provide a method and apparatus for removing the articles in their elongated condition with the proper side out.

My method of removal involves the use of force applied first to the upper portions of the rubber articles whereby these upper portions are forced or caused to slide downwardly gradually on the dipping forms, the rubber of the upper portions forming a series of wrinkles or creases as it moves toward the ends of the forms. Before the upper portions of the rubber articles are forced downwardly to the point where the articles might turn inside out, I remove this force and apply a force from below the articles which pulls or beats the lower portions of the articles downwardly, thus permitting removal of the article without rolling up or turning inside out.

Since the rubber articles fit tightly on the forms and are of somewhat delicate composition, care must be taken in their removal not to tear same, and, accordingly, another object is to provide novel means in the form of flexible fingers which subject the articles to the necessary action to slide them gently down the forms without tearing.

A further object is to provide a second set of flexible fingers which strike adjacent the tips of the articles without tearing same and which supply the force acting on the articles from below.

Further objects are to provide for lubrication of the articles and for loosening of the tips thereof to assist in their proper removal.

Other objects and advantages will become apparent from the following description taken in conjunction with the accompanying drawings.

In the drawings:

Fig. 1 is a side elevation of my apparatus and the conveyor leading thereto, with parts shown in section;

Fig. 2 is an enlarged section taken substantially on line 2—2 of Fig. 1, with parts shown in elevation;

Fig. 3 is another section taken substantially on line 3—3 of Fig. 1, with parts shown in elevation;

Fig. 4 is an additional section taken substantially on line 4—4 of Fig. 1 with some parts omitted and others shown in elevation; and Fig. 5 is an enlarged detail view of a portion of the apparatus showing the various positions of the articles on the forms as they are engaged by the flexible fingers.

In carrying out my invention, I prefer to use an endless overhead conveyor system for carrying the forms with the rubber articles thereon. Preferably, the rubber articles have been subjected only to about a three-quarters cure and require a final cure after removal from the forms, but my invention is also adapted for use with fully cured articles. The conveyor system includes a track 10 suspended from a suitable support 11 by hangers 12, only one of which is shown. Arranged for propulsion along said track is an articulated endless conveyor comprising spaced, C-shaped yokes 13 upon which are journaled respective pairs of wheels 14 that ride upon lateral flanges of track 10. Adjacent yokes 13 are connected to each other by carriers, indicated as a whole by numeral 15', each of which comprises a pair of end-brackets 15, 15 connected by a pair of parallel rods 16, 16. One end of each carrier 15 is pivotally connected to a yoke 13 so as to be movable relatively thereof about a horizontal axis, while the other end of each carrier is pivotally connected to an adjacent yoke 13 for movement relatively thereof about a vertical axis, the arrangement being such that the conveyor may turn corners and move upwardly and downwardly to different levels, as will be understood. Each carrier bracket 15 is formed with an angular, depending portion 17, which constitutes cradle-like supports for a dipping form assembly or rack, indicated as a whole by numeral 18.

Each rack 18 comprises a hollow metal tray structure 19 in which is journaled a double row of vertical shafts 20, 20, the lower ends of which, below the tray, carry respective hollow dipping forms 21, 21 of metal, porcelain, glass or other suitable material. The upper ends of shafts 20, above the tray, have respective spur gears 22 secured thereon, the gears of each row of shafts being meshed in a train, and one gear of each train has a superposed sprocket 23 thereon to drive the trains of gears. The sprockets 23 of each rack are offset so as not to interfere with each other and the teeth thereof engage spaced, parallel, fixed chains 24, 24 to rotate the gears and consequently the dipping forms 21. Chains 24, 24 are carried in channels 25, 25 formed in spaced channel bars 26, 26 extending longitudinally of the conveyor and being suitably supported from member 11. These chains have their end portions looped about arcuate end pieces 27 and at one end each chain is fixedly secured while at the other end an adjustable connection is desirable, as will be understood. When the racks are propelled between the chains 24, 24, sprockets 20 will engage the latter to rotate forms 21 and since gears 22 of each train are meshed, the adjacent forms 21 will rotate in opposite directions. As the forms with the rubber articles 28 thereon are propelled by the conveyor they pass through a lubricating chamber 29 wherein they are sprayed by water or other suitable liquid. Only one spraying device 30 is illustrated but a second sprayer is arranged on the opposite side of the forms and simultaneous operation of the two sprayers is preferred. A tank 31 is adapted to receive any surplus liquid.

After leaving the lubricating chamber the rubber articles are ready to be removed and the apparatus for removing same comprises a pair of driven rollers 32, 32 each having a plurality of radial, flexible fingers 33 extending therefrom. These fingers are preferably formed of rubber, have a flat outer surface and increase in width toward their inner ends. Any suitable means may be utilized for securing the fingers to the rollers and in this instance a plurality of strips of rubber, each formed into a plurality of fingers, are cemented in radial grooves 34 formed in the rollers whereby the flexibility of the projecting portions of the fingers is assured.

As shown, rollers 32 are arranged whereby the forms 21 pass between them for engagement by the flexible fingers 33, each row of forms being acted upon by the fingers of one of the rollers. Each roller 32 is mounted for adjustment as to its angle of inclination as well as for horizontal and vertical adjustment to permit proper contact of the flexible fingers with the forms and rubber goods thereon.

Each roller 32 is journaled for rotation in an elongated, substantially U-shaped frame 35, and to allow for angular adjustment each frame may be turned a limited extent about a pin or bolt 36 which secures the frame to a tubular supporting sleeve 37. Angular or turning movement of each frame is controlled by an arcuate slot 38 formed in a projection on sleeve 37, bolts 39 and nuts 40 being utilized to secure the frames at the angle of inclination desired for the rollers, as will be understood.

Sleeves 37 are press-fitted or otherwise tightly secured to the upper ends of posts 41 and the latter are slidably received in collars 42 which may be tightened to prevent turning of the posts 41 after the latter have been adjusted vertically in a manner to be described. A lug 43 on each sleeve threadably receives a bolt 44, the lower end of which bears against a projection 45 on collars 42 whereby vertical adjustment of the frames and rollers may be effected by turning bolts 44 to raise and lower posts 41.

Horizontal adjustment of the respective frames and rollers toward and away from each other is accomplished by forming each collar 42 with extending portions 46 which encircle a pair of spaced supporting rods 47 arranged transversely of the conveyor, said portions 46 being slidable on rods 47 and being split as at 48 to permit tightening about said rods in the customary manner. Parallel horizontal movement of the frames and rollers is obtained by mounting rods 47 in the upper portions of collars 49, the lower portions of which encircle spaced supporting rods 50 extending longitudinally of the conveyor, the arrangement being such that rods 47 and all elements supported thereon may be moved along rods 50 when desired. Collars 49 are provided with the customary set-screws or bolts for tightening same on rods 47 and 50. Rods 50 are supported at spaced points by a plurality of standards 51 which may be secured in a suitable foundation, such as a floor.

Intermediate their ends, each rod 47 is provided with a collar 52 which receives respectively the lower end of a vertical rod 53 and an inclined rod 54. The upper ends of the latter rods support a spacing and aligning member 55 which extends between the parallel rows of dipping forms 21 and serves properly to aid in spacing the dipping forms and to keep them in proper alignment for engagement by the flexible fingers. Vertical rod 53 carries an extension 56 intermediate its ends which receives a stem 57 of a shelf 58 to which is secured a flexible article engaging member 59 formed of rubber or other suitable material. As shown, the flexible member 59 is curved and arranged whereby when lightly engaged by the tips of the rubber articles on the dipping forms, the tips will be loosened. A set screw or bolt 60 extends through member 56 into engagement with stem 57 to permit vertical adjustment of the latter. With some rubber goods the tips may not require loosening and when such goods are being removed member 59 may be lowered out of engagement therewith.

Preferably a separate means is provided for rotating each roller 32 and in this instance a motor 61 is suitably supported on each frame 35. Each motor has a gear reducing unit 62 associated therewith and drives a shaft 63 which carries a pinion 64 adapted to mesh with an idler gear 65, the latter meshing with a pinion 66 carried on shaft 67 of roller 32. Suitable brackets 68 carried by frames 35 support the idler gears 65 and the journals for shafts 67.

Forwardly of rollers 32 a second pair of rollers 70, 70 is arranged. This pair of rollers is considerably smaller than rollers 32, but is also formed with a plurality of radial, flexible fingers 71, preferably formed of rubber, having flat outer surfaces and increasing in width toward their inner ends. The rollers 70 are tapered, and are angularly disposed with relation to the respective rows of dipping forms 21, the arrangement being such that the lower ends of the forms first engage the fingers 71 at the smaller end of the rollers, and as the forms move along their course they are engaged at progressively higher regions by reason of the position of the rollers and the greater diameter thereof at their end portions last engaged by the forms, as is most clearly shown in Figure 5.

Any suitable means may be utilized for rotating the rollers 70 and in this instance each roller 70 is rotated by a shaft 72 connected thereto at one end as at 73, the opposite end of each shaft 72 having a universal joint connection 74 with a shaft 75. The latter shafts each extend into a tubular shaft 76 which is connected through a universal joint 77 with a shaft 78 journaled in suitable bearings 79. Tubular shafts 76 have a longitudinal slot 80 therein which receives a pin 81 carried on shaft 75 to provide a driving connection between shafts 75 and 76 when they are rotated. The arrangement of shafts is such that rotation of shafts 78 will rotate rollers 70, and by means of suitable driving means to be referred to, rollers 70 are rotated in opposite directions.

To support the shafts and bearings a plate 82 is secured as at 83 to a pair of transverse supporting members 84 arranged between rods 50. Each member 84 extends upwardly at an angle from each rod 50 to provide a raised horizontal portion 85 which receives plate 82, as clearly shown in Figure 4. Also, as clearly seen in the latter figure, bearings 79 for shafts 78 are supported above plate 82 in brackets 86 which are bolted at 87 to the plate. Supporting the connected shafts at the rear of the device is a pair of adjustable supports 88 connected to a sleeve 89 surrounding each shaft 72 so as not to interfere with the rotation thereof. As more clearly shown in Fig. 5, each support 88 has an upper annular portion 90 which is received in a tubular portion 91 of sleeve 89 and the latter, as well as rollers 70, may be turned about portion 90, a set screw 92 being provided to secure the sleeve against turning when desired positions for rollers 70 have been reached. Each support 88 also has a depending portion 93 provided with a longitudinal slot 94 through which screws or bolts extend to secure the supports 88 for vertical adjustment to a vertical flange 95 of an annular horizontal supporting member 96. This arrangement permits raising and lowering of rollers 70 as will be understood. Each annular member 96 is received in a tubular portion 97 of a bracket 98 secured to extensions 99 on plate 82. As more clearly seen in Fig. 2, annular portions 96 may be turned to provide additional adjustment of rollers 70, and set screws 100 extend through portions 97 into contact with portions 96 to prevent undesired turning. Brackets 98 have horizontal slots 101 therein through which bolts 102 extend to secure these brackets for horizontal adjustment on extension 99.

It is also possible to move the transverse supports 84 along rods 50 since they preferably are slidably connected to these rods, and it will be apparent that rollers 70 may be adjusted substantially to any desired position.

As previously stated, means are provided to rotate rollers 70 in opposite directions. Depending from plate 82 is a motor supporting bracket 103 which supports motor 104 that drives a shaft 105 having a V-grooved wheel 106 mounted for rotation therewith. A V-belt 107 is arranged in driving relation between wheel 106 and a larger V-grooved wheel 108 mounted for rotation with shaft 109 which is journaled in suitable bearings 110 carried in brackets 111 depending from plate 82. Forwardly of plate 82 shaft 109 carries a sprocket 112 that drives a chain 113 which passes over a sprocket 114 mounted for rotation with one shaft 78, under an idler sprocket 115 mounted on plate 82 as at 116, under a sprocket 117 mounted for rotation with the other shaft 78, and then over an idler sprocket 118 mounted on a bracket arm 119 extending from one of the brackets 86. By thus passing chain 113 over sprocket 114 and under sprocket 117 I am enabled to rotate rollers 70 in opposite directions while utilizing a single motor.

The operation of the device is believed to be obvious from the foregoing description. As the dipping forms 21 with the rubber goods thereon are conveyed through the lubricating chamber they preferably are sprayed with water, which facilitates their removal, and continue their travel into the path of rollers 32 and flexible fingers 33. Rollers 32 are inclined whereby the flexible fingers at the upper end of the rollers engage the upper beaded portions of the rubber articles and force the upper portions to slide downwardly on the dipping forms. Since the conveyor is continuously in motion, as these upper portions are forced downwardly they are engaged by the next adjacent fingers 33 and are gradually forced farther downwardly, this action continuing until the rubber articles have been engaged by the last fingers on rollers 32. At this time the articles will have been forced downwardly substantially to the positions shown in Fig. 5 just prior to their engagement with member 59, and it will be noted that in moving down the dipping forms, the upper portions of the rubber articles form a series of wrinkles or pleats and do not roll up. The tip portions may or may not have become loosened depending upon how tightly the rubber tends to adhere to the forms. In any event, at this stage in the operation there is no tendency for the rubber articles to turn inside out and if the tips have been loosened sufficiently so that the articles are ready to fall off, they will immediately drop into a hopper or bin 120 arranged to receive them.

Only a few of the rubber articles, however, are usually loose enough to fall off at this time and it becomes necessary to loosen them by other means. Experience has shown that if the flexible fingers are allowed to continue their downward forcing action, i. e. if the fingers 33 are permitted to force the articles completely off the forms, a large number of the articles will be turned inside out, due to sticking of the tips and the rubber adjacent the tips. Accordingly, it becomes necessary to discontinue application of force to the upper portions of the rubber articles and provide some means for either loosening the tips or for pulling or beating the articles from below. Next, I pass the articles into engagement with flexible member 59, substantially as shown in Fig. 5, which loosens the tips sometimes sufficiently to permit them to drop off the forms, but most of the articles still require additional force to remove them. Hence, I then pass the articles into contact with flexible fingers 71.

Referring now to Figs. 2 and 5, it will be observed that the free ends of rollers 70 extend beneath the dipping forms 21 and the angles at which these rollers are arranged permit the flexible fingers 71 adjacent the free ends of the rollers to reach just slightly above the tips of the rubber articles on the forms. These fingers supply a pulling or beating action against the tips and against the rubber just above the tips whereby the rubber articles are pulled from the forms with no tendency for them to turn inside out. A sufficient number of fingers 71 are provided whereby continued application of force from these fingers will remove even the most stubborn articles without rolling them up or turning them inside out. Upon dropping into the hopper some of the pleated articles straighten out and tend to assume their normal elongated shapes, while others must be straightened out by other means.

It is believed to be apparent that I have provided a novel method and apparatus for removing dipped rubber articles from their dipping forms which is positive in operation and which prevents the articles from rolling up or turning inside out.

While I have illustrated and described the preferred method and the preferred form of apparatus for carrying out my invention, it will be apparent that the invention is not so limited, and various modifications may be made within the scope of the subjoined claims.

What is claimed is:

1. Apparatus for removing elongated dipped rubber articles from their formers which comprises means for sliding the upper portions of said articles gradually downwardly without rolling said upper portions, and means for applying a pulling or beating force to the lower portions of said articles, which force is applied progressively upwardly from the lower ends of the articles.

2. Apparatus for removing elongated dipped rubber articles from their formers which comprises means for sliding the upper portions of said articles gradually downwardly without rolling said upper portions, means for loosening the tips of said articles, and means for applying a pulling or beating force to the lower portions of said articles, which force is initially applied at the loosened tips of the articles and progresses upwardly therefrom.

3. In apparatus for removing elongated dipped rubber articles from their formers, a plurality of flexible fingers to engage the upper portions of said articles progressively downwardly from the upper ends thereof, and a plurality of additional flexible fingers to engage the lower portions of said articles progressively upwardly from the lower ends thereof.

4. In apparatus for removing elongated dipped rubber articles from their formers, a plurality of flexible fingers to slide the upper portions of said articles downwardly of said formers, means for loosening the tips of said articles, and a plurality of additional flexible fingers to beat against the lower portions of said articles progressively upwardly from said loosened tips.

5. In apparatus for removing elongated dipped rubber articles from a continuously moving row of formers, means engaging the upper portions of said articles at a predetermined point in the path of travel of said formers and progressively sliding said upper portions down said formers until the latter have travelled a predetermined distance, means arranged below said articles engageable by the tips of said rubber articles to loosen the tips as they pass thereover, and means therebeyond operable to apply a downwardly directed beating action upon the lower portions of said articles, which action progresses upwardly of the articles from the loosened tips thereof.

6. Apparatus constructed in accordance with claim 5 wherein said first and last mentioned means comprises a plurality of rotatable flexible rubber fingers.

7. In apparatus for removing elongated dipped rubber articles from continuously moving parallel rows of formers, a plurality of rotatable flexible fingers arranged beside each row of formers to engage and slide the upper portions of said articles downwardly of said formers, and a plurality of additional flexible fingers arranged adjacent each row of formers to engage the lower portions of said articles, progressively upwardly from the lowermost extremities thereof, the latter fingers rotating in the same direction as those first mentioned.

8. In apparatus for removing elongated dipped rubber articles from continuously moving parallel rows of formers, a plurality of rotatable flexible fingers arranged beside each row of formers to engage and slide the upper portions of said articles part way down said formers, stationary yielding means common to both rows of formers and arranged below same engageable by the tips of said rubber articles to loosen the tips, and a plurality of additional rotatable flexible fingers arranged beside each row of formers to engage the lower portions of said articles progressively upwardly from the tips thereof.

9. The method of removing elongated dipped rubber articles from forms which comprises sliding the upper portions of said articles progressively downwardly of the forms a determinate distance without rolling said upper portions, and then beating the lower portions of said articles progressively upwardly from the lower ends thereof to remove them from the forms without turning inside out.

10. The method of removing elongated dipped rubber articles from forms which comprises forcing the upper portions of said articles downwardly on the forms without rolling said portions, loosening the tips of the articles from the lower end of the forms, and then applying a downwardly acting force to the articles progressively upwardly thereon from the loosened tips thereof.

ROLLYN VAN HYNING.